(12) United States Patent
Matsufuji et al.

(10) Patent No.: US 7,226,499 B2
(45) Date of Patent: Jun. 5, 2007

(54) CELLULOSE ACYLATE FILM, CELLULOSE ACYLATE FILM WITH FUNCTIONAL THIN FILM, AND METHOD FOR PREPARATION THEREOF

(75) Inventors: Akihiro Matsufuji, Minamiashigara (JP); Yuuzou Muramatsu, Minamiashigara (JP); Yukio Shinagawa, Minamiashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 10/470,193

(22) PCT Filed: Jan. 23, 2002

(86) PCT No.: PCT/JP02/00458

§ 371 (c)(1),
(2), (4) Date: Jul. 25, 2003

(87) PCT Pub. No.: WO02/059192
PCT Pub. Date: Aug. 1, 2002

(65) Prior Publication Data
US 2004/0077752 A1    Apr. 22, 2004

(30) Foreign Application Priority Data
Jan. 25, 2001    (JP) .............................. 2001-016724

(51) Int. Cl.
*C08L 1/10*    (2006.01)
*C09D 10/10*    (2006.01)
*C08K 3/22*    (2006.01)
*C08K 3/34*    (2006.01)

(52) U.S. Cl. ............................ 106/170.57; 106/170.58; 106/171.1; 524/413; 524/437; 524/444; 524/492; 524/493

(58) Field of Classification Search ................ 524/401, 524/413, 437, 444, 492, 493; 106/170.57, 106/170.58, 171.1
See application file for complete search history.

(56) References Cited

U.S. PATENT DOCUMENTS

| 3,846,161 | A | * | 11/1974 | Marks ........................ 264/430 |
| 5,075,204 | A | * | 12/1991 | Shiba et al. ................ 430/496 |
| 5,376,172 | A | * | 12/1994 | Tripp et al. ................. 106/490 |
| 5,853,461 | A | * | 12/1998 | Wagner ......................... 106/2 |
| 6,686,031 | B2 | * | 2/2004 | Matsufuji et al. ........... 428/212 |
| 2004/0052937 | A1 | * | 3/2004 | Ito et al. ..................... 427/162 |

FOREIGN PATENT DOCUMENTS

| JP | 5-124100 | * | 5/1993 |
| JP | 10-44327 A | | 2/1998 |
| JP | 10-95862 | | 4/1998 |
| JP | 11-5851 | | 1/1999 |
| JP | 11-005851 A | | 1/1999 |
| JP | 2001-2799 | | 1/2001 |

OTHER PUBLICATIONS

Stochem Product Sheet (2003) www.stochem.com/searchdb.asp?searchStr2=&supplier=510&page=3.*
Macromolecules 1994, 27, 606-607. Tanahashi et al "Adsorption of Poly(N-isopropylacrylamide) on Silica Surfaces".*

* cited by examiner

*Primary Examiner*—Nathan M. Nutter
(74) *Attorney, Agent, or Firm*—Buchanan Ingersoll & Rooney PC

(57) ABSTRACT

The present invention relates to a cellulose acylate film having a high modulus of elasticity and a high surface hardness. The cellulose acylate film of the present invention is characterized by containing 1 vol % to 99 vol % of a metal oxide having an average particle size of 1 nm to 400 nm. The metal oxide used here is preferably a metal oxide having a Mohs hardness of at least 7, and specific examples thereof include aluminum oxide and silicon dioxide. This metal oxide may be subjected to a surface treatment. Furthermore, a functional thin film such as a hardcoat layer may be formed on the cellulose acylate film containing the metal oxide.

10 Claims, 1 Drawing Sheet

CELLULOSE ACYLATE FILM, CELLULOSE ACYLATE FILM WITH FUNCTIONAL THIN FILM, AND METHOD FOR PREPARATION THEREOF

TECHNICAL FIELD

The present invention relates to a cellulose acylate film used in a polarizing plate of a liquid crystal display device, a protection film, etc. and, furthermore, it relates to a cellulose acylate film that has improved mechanical properties such as surface hardness and modulus of elasticity.

BACKGROUND ART

Cellulose acylate films are widely used in optical applications such as protection films for polarizing plates since they can be easily produced in the form of films that have excellent transparency and low refractive index an isotropy.

Accompanying increases in the range of applications of liquid crystal display devices and the places they are used, there is an increasing demand for the protection film surface to have high mechanical strength in order to prevent damage to the display screen.

However, cellulose acylate films have the drawbacks of a small modulus of elasticity and a low surface hardness in comparison with polyester films, which are often used as protection films, etc.

DISCLOSURE OF INVENTION

A first object of the present invention is to provide a cellulose acylate film that has a high modulus of elasticity and a high surface hardness, and a second object thereof is to provide a cellulose acylate film that has a functional thin film having a high surface hardness.

It has been found that the above-mentioned objects can be achieved by the following means.
(1) A cellulose acylate film containing at least 1 vol % and at most 99 vol % of a metal oxide having an average particle size of at least 1 nm and at most 400 nm,
(2) the cellulose acylate film according to (1) wherein the metal oxide is a metal oxide having a Mohs hardness of at least 7,
(3) the cellulose acylate film according to (1) or (2) wherein the metal oxide is aluminum oxide or silicon dioxide,
(4) the cellulose acylate film according to any one of (1) to (3) wherein the metal oxide has been subjected to a surface treatment with a surface modifying agent having an organic segment,
(5) the cellulose acylate film according to any one of (1) to (4) wherein it has a modulus of surface elasticity of at least 4 GPa,
(6) a cellulose acylate film that has a layered structure comprising at least two layers, that is, a layer formed from the cellulose acylate film according to any one of (1) to (5) and a layer containing substantially no metal oxide,
(7) a cellulose acylate film with a functional thin film in which the functional thin film is formed on the cellulose acylate film according to any one of (1) to (6), and
(8) a process for producing a cellulose acylate film comprising casting a cellulose acylate dope containing at least 1 vol % and at most 99 vol % of a fine dispersion of fine metal oxide particles having an average particle size of at least 1 nm and at most 400 nm, the fine metal oxide particles having been subjected to a surface treatment with a surface modifying agent.

The 'dope' referred to in the present invention denotes a concentrated solution of a cellulose acylate. The cellulose acylate denotes a lower carboxylic acid ester of cellulose and may be a single ester or a mixed ester. With regard to the above-mentioned cellulose acylate film, as described later, a cellulose triacetate film is preferred in all cases.

BEST MODE FOR CARRYING OUT THE INVENTION

The cellulose acylate used for forming the cellulose acylate film related to the present invention is detailed below.

With regard to cellulose, which is a starting material for the cellulose acylate used in the present invention, there are cotton linter, wood pulp, etc. A cellulose acylate obtained from any starting cellulose can be used, and a mixture may be used.

With regard to cellulose acylates obtained from these celluloses, there are cellulose triacetate, cellulose acetate butyrate, cellulose acetate propionate, etc.

The cellulose acylate used in the present invention preferably satisfies all of the following expressions (I) to (IV) regarding the degree of substitution on the hydroxyl groups of the cellulose.

$$2.6 \leq A+B \leq 3.0 \tag{I}$$

$$2.0 \leq A \leq 3.0 \tag{II}$$

$$0 \leq B \leq 0.8 \tag{III}$$

$$1.9 < A-B \tag{IV}$$

In the expressions above, A and B denote the degrees of substitution of the cellulose hydroxyl groups with acyl groups; A is the degree of substitution with acetyl and B is the degree of substitution with an acyl group having 3 to 5 carbons. Cellulose has three hydroxyl groups on each glucose unit; the above-mentioned figures denote the degrees of substitution with respect to these 3.0 hydroxyl groups, and the maximum degree of substitution is therefore 3.0.

The degree of substitution is obtained by measuring the degree of bonding of the acetyl group and the acyl group having 3 to 5 carbons with which the cellulose hydroxyl groups are substituted. The measurement method is in accordance with ASTM D-817-91.

In the case of cellulose triacetate, the degree of substitution can be measured by a saponification method. That is, dried cellulose triacetate is precisely weighed and dissolved in a mixed solvent of acetone and dimethylsulfoxide (ratio by volume 4:1), a predetermined amount of a 1 M aqueous solution of sodium hydroxide is then added thereto, saponification is carried out at 25° C. for 2 hours, phenolphthalein is added as an indicator, excess sodium hydroxide is titrated with 0.5 M sulfuric acid, a blank test is carried out in the same way, and the degree of acetylation can be obtained using the equation below.

Degree of acetylation (%)=$(6.005 \times (B-A) \times F)/W$

The degree of substitution can be calculated from the degree of acetylation using the following equation.

Degree of substitution=$(3.86 \times \text{degree of acetylation})/(142.9 - \text{degree of acetylation})$ In the equations, A denotes the amount (ml) of 1 mol/L sulfuric acid required for the titration of a sample, B denotes the amount (ml) of 1 mol/L sulfuric acid required in the blank test, F denotes a factor for the 1 mol/L sulfuric acid, and W denotes the weight (g) of the precisely weighed cellulose triacetate.

In the case of a cellulose acylate other than cellulose triacetate, the degree of substitution with respect to all of the acyl groups is firstly obtained by calculating in the same way as for the degree of substitution for cellulose triacetate, the degree of acetylation is subsequently calculated by a method described in T. Sei, K. Ishitani, R. Suzuki, and K. Ikematsu, Polymer Journal Vol. 17, p. 1065 (1985), and the degree of substitution with acyl groups other than acetyl can be determined from the difference therebetween.

The cellulose acylate of the present invention is preferably cellulose triacetate in which all the acyl groups are acetyl, or one in which acetyl is at least 2.0, an acyl group having 3 to 5 carbons is at most 0.8, and preferably at most 0.3, and unsubstituted hydroxyl group is at most 0.4. Thereamong, a cellulose triacetate in which the degree of substitution A is at least 2.6 and at most 3.0 and B=0 is particularly preferred.

These cellulose acylates can be formed by acylating cellulose using an acylating agent such as an acid anhydride or an acid chloride.

A specific method for producing the cellulose acylate used in the present invention is described in, for example, JP-A-10-45804 (JP-A denotes a Japanese unexamined patent application publication.)

The degree of polymerization (viscosity-average degree of polymerization; DP) of the cellulose acylate used in the present invention is preferably 200 to 700 (200 to 700 means at least 200 and at most 700, the same applies below), and particularly preferably 250 to 550. In general, in order for the mechanical strength of a film, a fiber, or a molding of the cellulose acylate, including cellulose triacetate, to be tough, the degree of polymerization is preferably at least 200, as described in 'Serurosu Handobukku (Cellulose Handbook)' Ed. by H. Sofue and N. Uda, Asakura Publishing (1958) and 'Purasuchikku Zairyo Koza 17 (Plastic Material Course 17)' ed. by H. Marusawa and K. Uda, The Nikkan Kogyo Shimbun, Ltd. (1970).

The viscosity-average degree of polymerization of a cellulose acylate can be obtained by precisely weighing about 0.2 g of the oven-dried cellulose acylate, dissolving it in 100 ml of a mixed solvent of methylene chloride: ethanol=9:1 (ratio by weight), measuring the number of seconds taken for it to drop at 25° C. in an Ostwald viscometer, further repeatedly diluting with the mixed solvent and measuring the number of seconds taken for it to drop to obtain the limiting viscosity, and calculating using the equation below.

$\eta sp = T/T_0 - 1$ $[\eta] = \lim_{c \to 0} (\eta sp/C)$ $DP = [\eta]/Km$

T: number of seconds taken for a sample to drop
$T_0$: number of seconds taken for solvent alone to drop
C: sample concentration (g/l)
Km: $6 \times 10^{-4}$ The cellulose acylate that can be used in the present invention is preferably cellulose triacetate, and more preferably is of a photographic grade. With regard to manufacturers of cellulose triacetate, there are, for example, Daicel Chemical Industries, Ltd., Courtaulds, Hoechst, and Eastman Kodak, and any cellulose triacetate of a photographic grade can be used.

The cellulose acylate film of the present invention is preferably formed by a solvent casting method using a solution (dope) in which the cellulose acylate is dissolved in an organic solvent. Examples of the organic solvent preferably used as the solvent for dissolving the cellulose acylate include solvents selected from ethers having 3 to 12 carbons, ketones having 3 to 12 carbons, esters having 3 to 12 carbons, alcohols having 1 to 12 carbons, and halohydrocarbons having 1 to 7 carbons. These organic solvents may be used singly or in combination.

The ethers, the ketones, the esters, and the alcohols may have a cyclic structure. It is also possible to use as an organic solvent a compound having two or more functional groups (i.e., —O—, —CO—, —COO—, —OH, etc.).

Examples of the ethers having 3 to 12 carbons include diisopropyl ether, dimethoxymethane, dimethoxyethane, 1,4-dioxane, 1,3-dioxolane, tetrahydrofuran, anisole, and phenetole. Examples of the ketones having 3 to 12 carbons include acetone, methyl ethyl ketone, diethyl ketone, diisobutyl ketone, cyclopentanone, cyclohexanone, methylcyclohexanone, and acetylacetone. Examples of the esters having 3 to 12 carbons include ethyl formate, propyl formate, pentyl formate, methyl acetate, ethyl acetate, cyclohexyl acetate, pentyl acetate, methyl propionate, and γ-butyrolactone. Examples of the alcohols having 1 to 12 carbons include methanol, ethanol, 1-propanol, 2-propanol, 1-butanol, 2-butanol, t-butanol, 1-pentanol, 2-methyl-2-butanol, and cyclohexanol. Examples of the organic solvents having two or more functional groups include 2-ethoxyethyl acetate, 2-methoxyethanol, 2-butoxyethanol, and ethyl acetoacetate.

Examples of the halohydrocarbons having 1 to 6 carbons include methylene chloride and ethylene chloride. From the viewpoints of the global environment and the operating environment, the organic solvent preferably contains no halohydrocarbon.

These organic solvents may be used singly or as a mixture of two or more types of organic solvents. A mixed solvent of three or more mutually different types of organic solvents is particularly preferred, and a mixed solvent of an ester such as methyl acetate, methyl formate, or ethyl formate, a ketone such as acetone, cyclopentanone, cyclohexanone, or methyl acetylacetate, and an alcohol such as methanol is preferred.

When dissolving the cellulose acylate in the present invention, the cellulose acylate is preferably swollen in the solvent of the present invention beforehand at room temperature. The swelling time is preferably 0.1 to 24 hours, more preferably 0.2 to 6 hours, and yet more preferably 0.5 to 3 hours. During this process, a powerful stirring device is preferably used, and in some cases the use of a kneader, etc., or passage through a screw extruder is preferable.

The preferred dissolution temperature of the cellulose acylate used in the present invention may be room temperature, but preparation of a high concentration cellulose acylate solution is often difficult, and it is preferable to employ a cooling dissolution method or a high temperature, high pressure dissolution method, which will be described below.

The cooling dissolution method employed in the present invention is now explained in detail.

The swollen cellulose acylate solution of the present invention is cooled to −100° C. to −10° C., preferably −80° C. to −10° C., more preferably −80° C. to −30° C. and most preferably −80° C. to −50° C. The cooling can be carried out by, for example, a mechanical freezer (−100° C.), a dry ice-methanol bath (−75° C.), or a cooled diethylene glycol solution (−30° C. to −20° C.). The cooling time is not particularly limited, but the shorter the time, the more preferable in terms of productivity, and the cooling time is preferably 0.5 to 180 minutes, more preferably 0.5 to 30 minutes, and particularly preferably 0.5 to 10 minutes. The cellulose acylate solution obtained by cooling is then preferably heated to 0° C. to 50° C., thus giving a solution in which the cellulose acylate flows in the organic solvent.

Furthermore, in the present invention the mixed organic solvent solution of cellulose acylate may be dissolved by heating at 70° C. to 200° C. under a pressure of 0.3 MPa to 30 MPa. In this case, the heating temperature is preferably 70° C. to 180° C., and more preferably 70° C. to 160° C. Although the heating time is not particularly limited, the shorter the time, the more preferable it is, and the heating time is preferably 0.5 to 60 minutes, more preferably 0.5 to 30 minutes, and particularly preferably 1 to 10 minutes. It is also possible to employ a dissolution method in a so-called supercritical state by adding carbon dioxide to the solvent, and the carbon dioxide is preferably 5 to 30 wt % of the solution. In order to achieve a high pressure, it is necessary to use a pressure-resistant container or a pressure-resistant line, and an iron, stainless, or other metal pressure-resistant container or line can be used without particular limitation. After dissolution at high pressure, the solution is generally cooled to −10° C. to 50° C. and returned to normal pressure.

The cellulose acylate dope in the present invention obtained above may be prepared if necessary by dissolving at a low concentration in order to promote dissolution and by subsequently concentrating using concentrating means. When preparing the cellulose acylate solution of the present invention, it is preferable to take the explosion-proofing measure of filling the container with an inert gas such as nitrogen gas. When preparing the cellulose acylate solution of the present invention, the container may be filled with an inert gas such as nitrogen gas. The viscosity of the cellulose acylate solution immediately before film formation may be in a range that allows it to be cast when forming a film; it is usually preferably prepared in the range of 10 Pa·sec to 2000 Pa·sec, and particularly preferably 30 Pa·sec to 400 Pa·sec.

With regard to the fine metal oxide particles used in the present invention, metal oxide particles having a Mohs hardness of at least 7 are preferable. Specific examples thereof include silicon dioxide, titanium dioxide, zirconium oxide, and aluminum oxide. More preferred are silicon dioxide (silica) and aluminum oxide (alumina), which have a small difference in refractive index from the cellulose acylate.

The average particle size of these fine metal oxide particles is at least 1 nm and at most 400 nm, more preferably at least 5 nm and at most 200 nm, and yet more preferably at least 10 nm and at most 100 nm. When it is less than 1 nm, they are difficult to disperse and aggregated particles are easily formed; when it exceeds 400 nm, the haze increases, and in either case the transparency is undesirably degraded.

The amount of these fine particles added is 1 to 99 vol % of the cellulose acylate ('1 to 99 vol %' means at least 1 vol % and at most 99 vol %', the same applies below), preferably 5 to 80 vol %, more preferably 5 to 50 vol %, and particularly preferably 5 to 20 vol %.

'Containing substantially no metal oxide' means that the content thereof is less than 1 vol %.

In general, since the fine metal oxide particles have a highly hydrophilic surface, which has poor affinity for the cellulose acylate, merely mixing the two renders the interface fragile, causes cracks in the film, and makes it difficult to improve the scratch resistance. In order to improve the affinity between the fine inorganic particles and the cellulose acylate, it is preferable to subject the surface of the fine inorganic particles to a surface treatment with a surface modifying agent.

The surface modifying agent preferably has both a segment that bonds to the metal oxide (fine inorganic particles) and an organic segment that has high affinity for the cellulose acylate. Functional groups that can form bonds with the metal oxide are preferably, metal alkoxide compounds of silicon, aluminum, titanium, zirconium, etc.; compounds having an anionic group such as a phosphomonoester, a phosphodiester, or a sulfate monoester, a phosphoric acid group, a sulfonic acid group, a carboxylic acid group, a salt thereof, or an acid chloride thereof; compounds having an amino group, or compounds having an amide group.

The above-mentioned organic segment preferably has a structure having affinity for the cellulose acylate, and preferably contains a polar group such as an ester group, an epoxy group, or an ether group. Particularly preferred surface modifying agents are metal alkoxide compounds and those having both an anionic group and an ester, epoxy, or ether group.

Representative examples of the surface modifying agents are listed below.

Silane coupling agents

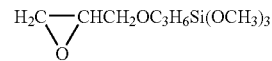

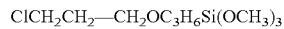

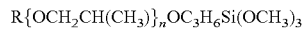

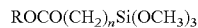

(In the above three formulae, n denotes an integer of 1 to 10, and R denotes an alkyl group having 1 to 4 carbons, such as methyl, ethyl, propyl, or butyl.)

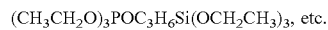

Titanate coupling agents

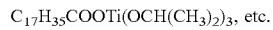

Specific examples include Plenact (KRTTS, KR46B, KR55, KR41B, KR38S, KR138S, KR238S, 338X, KR44, KR9SA) manufactured by Ajinomoto Co., Inc.

Aluminum coupling agents

Specific examples include Plenact AL-M (manufactured by Ajinomoto Co., Inc.).

Saturated carboxylic acids

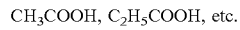

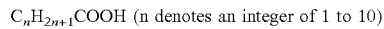

Unsaturated carboxylic acids
Oleic acid, etc.
Hydroxycarboxylic acids
Citric acid, tartaric acid, etc.
Dibasic acids
Oxalic acid, malonic acid, succinic acid, etc.

Aromatic carboxylic acids
Benzoic acid, etc.
Terminal carboxylic acid ester compounds $RCOO(C_5H_{10}COO)_nH$ (n=1 to 5)

$H_2C=CHCOO(C_5H_{10}COO)_nH$ (n=1, 2, 3), etc.

Phosphomonoesters, phosphodiesters $H_2C=C(CH_3)COOC_2H_4OCOC_5H_{10}OPO(OH)_2$ $(H_2C=C(CH_3)COOC_2H_4OCOC_5H_{10}O)_2POOH$ Phosphonic acid-containing organic compounds
Phenylphosphonic acid, etc.
Sulfate monoesters or sulfonic acid-containing organic compounds
Benzenesulfonic acid $H_2C=C(CH_3)COOC_2H_4OSO_3H$, etc.

Polyoxyethylene derivatives
Polyoxyethylene aryl ethers
Polyoxyethylene alkyl ethers
Polyoxyethylene aryl esters
Polyoxyethylene alkyl esters, etc.

Surface modification of the fine particles is preferably carried out in solution. The fine metal oxide particles are added to a solution in which the surface modifying agent has been dissolved, and the mixture is preferably treated while stirring and dispersing by means of ultrasound, a stirrer, a homogenizer, a dissolver, a planetary mixer, a paint shaker, a sand grinder, a kneader, etc.

The solution for dissolving the surface modifying agent is preferably an organic solvent having high polarity. Specific examples thereof include known solvents such as alcohols, ketones, and esters, and it is preferable to use a solvent having the same composition as that of the solvent used for the cellulose acylate dope.

Mixing of the fine metal oxide particles with the cellulose acylate can be carried out by adding the fine metal oxide particles to the cellulose acylate dope and mixing and dispersing them, but it is preferable to employ a method in which the fine metal oxide particles are subjected to a surface treatment and finely dispersed in advance, and added to the cellulose acylate dope. It is preferable to carry out further dispersion after the addition, and it is preferable to mix and disperse uniformly by means of a dissolver, a planetary mixer, a sand grinder, a kneader, a roll mill, etc.

Various additives may be added to the cellulose acylate solution of the present invention in each preparation step according to the intended purpose. Examples of the additives include a plasticizer, a UV inhibitor, and a degradation inhibitor (for example, an antioxidant, a peroxide decomposition agent, a radical inhibitor, a metal deactivator, an acid scavenger, or an amine).

Examples of the plasticizer preferably added include triphenyl phosphate (TPP), diphenyl biphenyl phosphate, tricresyl phosphate (TCP), dioctyl phthalate (DOP), tributyl o-acetylcitrate (OACTB), and acetyl triethyl citrate. With regard to a plasticizer that can reduce optical anisotropy, preferably used are (di)pentaerythritol esters described in JP-A-11-124445, glycerol esters described in JP-A-11-246704, diglycerol esters described in JP-A-2000-63560, citric acid esters described in JP-A-11-92574, substituted phenylphosphoric acid esters described in JP-A-11-90946, etc. These plasticizers may be used singly or in a combination of two or more types. The amount of plasticizer added is preferably 5 to 30 wt % relative to the cellulose acylate, and particularly preferably 8 to 16 wt %.

The degradation inhibitor and the UV inhibitor are described in JP-A-60-235852, JP-A-3-199201, JP-A-5-197073, JP-A-5-194789, JP-A-5-271471, JP-A-6-107854, JP-A-6-118233, JP-A-6-148430, JP-A-7-11056, JP-A-7-11055, JP-A-8-29619, JP-A-8-239509, and JP-A-2000-204173. Examples of the degradation inhibitor include butylated hydroxytoluene (BHT). A UV absorber preferably has an excellent ability to absorb UV at a wavelength of 370 nm or below and absorbs little visible light at a wavelength of 400 nm or above; examples thereof include oxybenzophenone compounds, benzotriazole compounds, salicylic acid ester compounds, benzophenone compounds, cyanoacrylate compounds, and nickel complex salt compounds, and the benzotriazole compounds and the benzophenone compounds are particularly preferred. The amount of these compounds added is preferably 1 ppm to 10,000 ppm as a proportion by weight relative to the cellulose acylate, and more preferably 10 to 1,000 ppm.

The retardation (Re) within the surface of the film is preferably in the range of 0 to 300 nm and is adjusted according to the intended purpose. The retardation (Rth) in the thickness direction of the film is also important, and the cellulose acylate film of the present invention has an Rth of 0 nm to 600 nm per 100 μm, and preferably 0 nm to 400 nm.

When forming the cellulose acylate film of the present invention, prior to casting the cellulose acylate solution, at least one type of release agent is preferably added thereto at 0.005 to 2 wt % of the solution, and the following compounds can be cited as examples;

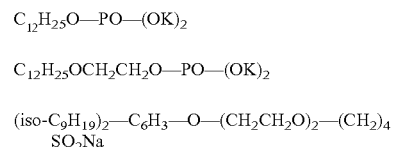

$C_{12}H_{25}O-PO-(OK)_2$ $C_{12}H_{25}OCH_2CH_2O-PO-(OK)_2$ $(iso-C_9H_{19})_2-C_6H_3-O-(CH_2CH_2O)_2-(CH_2)_4$
$SO_2Na$ The amount of release agent used is 0.002 to 2 wt % of the solution, and preferably 0.01 to 0.5 wt %. Furthermore, with the intention of preventing creaking of the film by adding fine particles, fine inorganic particles such as silica, kaolin, talc, diatomaceous earth, quartz, calcium carbonate, barium sulfate, titanium oxide, alumina, colloidal manganese, titanium dioxide, strontium barium sulfate, or silicon dioxide, or a salt of alkaline earth metal such as calcium or magnesium may be added. In this case, the average height of surface protrusions is 0.005 to 10 μm, and preferably 0.01 to 5 μm, and when the protrusions are formed from a spherical or amorphous matting agent, the content thereof is 0.5 to 600 mg/m$^2$, and preferably 1 to 400 mg/m$^2$.

Prior to casting, the cellulose acylate solution is preferably subjected to filtration using an appropriate filtering material such as a wire mesh, paper, or flannel to remove foreign matter such as undissolved material, dust, and impurities. Filtration of the cellulose acylate solution usually employs a filter having an absolute filtration rating of 0.05 to 100 μm, and preferably a filter having an absolute filtration rating of 0.5 to 10 μm. In this case, filtration is carried out under a filtration pressure of at most 1.57 MPa, preferably at most 1.18 MPa, more preferably at most 0.98 MPa, and particularly preferably at most 0.20 Mpa.

A process for producing the cellulose acylate film filled with the metal oxide in the present invention is described. A solution casting film formation process and a solution casting film formation machine used in the conventional production of a cellulose triacetate film can be employed as the process for producing the cellulose acylate film of the present invention and equipment therefor.

The solution casting film formation machine is explained below by reference to FIG. 1. Dopes 11, 21 (cellulose acylate solutions) prepared in a dissolving tank (vessel) are temporarily stored in stock tanks 31, 32, and final preparation is carried out by removing bubbles contained in the dopes. The dopes are fed to a pressure type die 40 through dope outlets via, for example, pressure type metering gear pumps 33, 34 that can feed a fixed amount of solution with high precision based on rotational speed; the dopes are uniformly cast from a casting outlet (slit) of the pressure type die onto a support 37 of an endlessly running casting section; and a half-dried dope film 39 (also called a web) is released from the support at a release point where the support 37 has traveled nearly once around rotating stainless support drums 35, 36. Opposite edges of the web thus obtained are clamped by clips, it is fed and dried by a tenter while holding it in the width direction, it is subsequently fed by means of a set of rolls of a dryer, drying is completed, and a predetermined length thereof is wound up by a winder. The combination of the tenter and the roll dryer can be changed according to the intended purpose.

In the present invention, the cellulose acylate solution filled with the metal oxide may be cast as a single layer solution on a flat band or a drum as a support, or a plurality of 2 or more layers of cellulose acylate solutions may be co-cast. When the plurality of cellulose acylate solutions are cast, tandem casting may be employed, in which the cellulose acylate solutions are layered to form a film by casting via a plurality of casting outlets arranged at intervals in the direction in which the support advances, or a film may be formed by co-casting cellulose acylate solutions via two adjacent casting outlets. With regard to these casting methods, methods described in JP-A-6-134933, JP-A-11-198285, etc. can be employed.

It is also possible to form a layered flow of two types of cellulose acylate solutions in front of a pressure type die, which is a casting outlet, thus casting in a layered flow state.

The drying step of drying the dope on the support in the production of the cellulose acylate film of the present invention is carried out at a drying temperature of 30° C. to 250° C., and particularly preferably 40° C. to 180° C., and is described in JP-B-5-17844 (JP-B denotes a Japanese examined patent application publication). Furthermore, there is a method in which drawing in the width direction is carried out actively, and in the present invention it is as described in, for example, JP-A-62-115035, JP-A-4-152125, JP-A-4-284211, JP-A-4-298310, JP-A-11-48271, etc. The film may be drawn monoaxially or biaxially. The draw factor (proportion of the increase by drawing relative to the original length) of the film is preferably 10% to 30%.

The thickness of the finished (dried) cellulose acylate film of the present invention varies according to the intended purpose; it is usually in the range of 5 to 500 μm, preferably in the range of 20 to 250 μm and, in particular, most preferably in the range of 30 to 180 μm. For optical purposes, it is particularly preferably in the range of 30 to 110 μm.

In the case of a layered film having 2 or more layers, the highly elastic cellulose acylate layer filled with the metal oxide preferably has a thickness of at least 5 μm and at most 100 μm, and more preferably at least 10 μm and at most 50 μm.

The thickness can be adjusted by means of the concentration of solids contained in the dope, the slit gap of the die outlet, the pressure with which the dope is extruded through the die, the speed of the support, etc.

The transparency of the finished cellulose acylate film of the present invention is preferably at least 85%, and more preferably at least 90%. The transparency referred to here means an average transparency in the visible region. The transparency can be measured by a device described in Examples.

Furthermore, the haze of the finished cellulose acylate film of the present invention is preferably at most 5%, and more preferably at most 1%.

The average transparency and the haze can be measured by devices described in the Examples.

In the present invention, by subjecting the cellulose acylate film to a surface treatment, bonding between the cellulose acylate film and each functional layer (for example, a hardcoat layer, an undercoat layer, and a back layer) can be improved. In order to improve the bonding, a glow discharge treatment, a UV radiation treatment, a corona treatment, a plasma treatment, a flame treatment, or an acid or alkaline treatment can be employed. Furthermore, an alkaline saponification treatment, which is preferred as the surface treatment of the present invention, is usually carried out by a cycle involving immersing the film surface in an alkaline solution, then neutralizing with an acidic solution, washing with water, and drying. Examples of the alkaline solution include a potassium hydroxide aqueous solution and a sodium hydroxide aqueous solution; the concentration of hydroxyl ions is preferably 0.1 mol/L to 3.0 mol/L, and more preferably 0.5 mol/L to 2.0 mol/L. The temperature of the alkaline solution is preferably from room temperature to 90° C., and more preferably 30° C. to 70° C. In general, the film that has been treated with the alkaline solution is then washed with water, subsequently passed through an aqueous acidic solution, and again washed with water to give a surface-treated cellulose acylate film. Examples of the acid that can be used here include hydrochloric acid, nitric acid, acetic acid, formic acid, chloroacetic acid, and oxalic acid; the concentration thereof is preferably 0.01 mol/L to 3.0 mol/L, and more preferably 0.05 mol/L to 2.0 mol/L. When the acid is a dibasic acid such as sulfuric acid, the concentration thereof is preferably 0.005 mol/L to 1.5 mol/L, and more preferably 0.025 mol/L to 1.0 mol/L. In order to bond the cellulose acylate film support of the present invention and the functional layer together, it is also preferable to provide an undercoat layer (an adhesive layer) and apply a desired functional layer on top thereof.

It is also possible to provide at least one antistatic layer in the cellulose acylate film of the present invention. As a conductive material, a conductive metal oxide or a conductive polymer is preferable. A transparent conductive film may be formed by vaporization or sputtering. The conductive layer may be the outermost layer or the innermost layer. With regard to the conductivity of the conductive layer, the resistance thereof is preferably $10^0$ to $10^{12}$ Ω, and particularly preferably $10^0$ to $10^{10}$ Ω. A conductive metal oxide is preferably used; preferred examples thereof include $ZnO$, $TiO_2$, $SnO_2$, $In_2O_3$, $MgO$, $BaO$, $MoO_2$, and $V_2O_5$, and composite oxides thereof; and $ZnO$, $TiO_2$, and $V_2O_5$ are particularly preferable. Examples of conductive ionic high molecular weight compounds include ionene type polymers having dissociative groups in main chains and cationic pendant type polymers having cationically dissociative groups in side chains. Moreover, as the conductive material of the present invention, organic electron-conducting materials are preferable, and examples thereof include polyaniline derivatives, polythiophene derivatives, polypyrrole derivatives, and polyacetylene derivatives.

In the present invention, a surfactant may be used in any of the functional layers, and the surfactant may be nonionic, cationic, or of a betaine type. Furthermore, a fluorinated surfactant can preferably be used as an organic solvent wettability improving agent and an antistatic agent. In the present invention, it is also possible to add a lubricant to any layer on the cellulose acylate film, and known examples thereof include a polyorganosiloxane described in JP-B-53-292, a higher fatty acid amide described in U.S. Pat. No. 4,275,146, and higher fatty acid esters (esters of a fatty acid having 10 to 24 carbons and an alcohol having 10 to 24 carbons) described in JP-B-58-33541, GB Pat. No. 927, 446, JP-A-55-126238, and JP-A-58-90633.

The cellulose acylate film of the present invention can be used for various purposes. It can be used as an optical compensation sheet or a biaxially drawn cellulose acylate film. That is, various functional thin films can be formed on the cellulose acylate film. Examples of the functional thin films include an antireflective layer, an antiglare layer, an antistatic layer, a λ/4 layer, and a hardcoat layer. It is possible to provide a hardcoat layer to give a functional film having a high surface hardness and, in particular, it is suitable for a film with a high hardness functional thin film where the film has a hardcoat layer and a further functional thin film such as an antireflective layer on top of the hardcoat layer. The thickness of the functional thin film varies depending on the intended function. For example, the thickness of the antireflective layer is 1 nm to 100 nm, and preferably a few tens of nm to a few hundreds of nm, and the thickness of the hardcoat layer is 1 μm to 100 μm, and preferably a few μm to 800 μm. 'A few tens of nm' referred to here customarily means 20 nm to 60 nm.

The hardcoat layer has a function of imparting scratch resistance to the cellulose acylate substrate of the present invention. It is preferable for the cellulose acylate film of the present invention to be provided with the hardcoat layer.

The hardcoat layer contains a cross-linked binder polymer. The hardcoat layer containing the cross-linked binder polymer can be formed by coating a transparent substrate with a coating solution containing a polyfunctional radiation polymerizable compound and a polymerization initiator, and polymerizing the polyfunctional radiation polymerizable compound. As a functional group, a polymerizable unsaturated double bond group is preferable. Examples of the polymerizable unsaturated double bond group include an acrylate group, a methacrylate group, and a vinyl group. From the viewpoint of reactivity, the acrylate group is preferably used.

The hardcoat layer used in the present invention can be formed using a known polymerizable resin; there are thermosetting resins, radiation polymerizable resins, etc., and the radiation polymerizable resins are preferable. Examples of the thermosetting resins include reactive resins employing a cross-linking reaction of a prepolymer such as a melamine resin, a urethane resin, or an epoxy resin.

With regard to the radiation, there are radioactive rays, gamma rays, alpha rays, electron beams, UV light (including near-UV light, mid-UV light, far-UV light, and vacuum UV light), etc., and UV light is preferable.

The polyfunctional radiation polymerizable compound is preferably an ester of a polyhydric alcohol and acrylic acid or methacrylic acid. Examples of the polyhydric alcohol include ethylene glycol, 1,4-cyclohexanediol, pentaerythritol, trimethylolpropane, trimethylolethane, dipentaerythritol, 1,2,4-cyclohexanetriol, polyurethane polyols, and polyester polyols. Trimethylolpropane, pentaerythritol, dipentaerythritol, and polyurethane polyol are preferable.

Two or more types of the polyfunctional radiation polymerizable compounds may be used in combination.

Examples of the radiation polymerizable compound include radiation, in particular UV, polymerizable polyfunctional compounds such as pentaerythritol tetra(meth)acrylate, dipentaerythritol hexa(meth)acrylate, and trimethylolpropane tri(meth)acrylate.

The thickness of the hardcoat layer can be appropriately selected, but it is 5 to 50 μm, and preferably 10 to 30 μm.

By adding fine inorganic particles to the hardcoat layer, the cross-linking shrinkage of a coating can be improved, the flatness of the coating can be enhanced, and the hardness of the coating can be increased. The fine inorganic particles are generally harder than organic materials and are not shrunk by UV radiation, etc. By adding the fine inorganic particles to the hardcoat layer, the entire layer therefore becomes harder, the scratch resistance can be improved, shrinkage of the hardcoat layer due to the cross-linking reaction can be suppressed, and the film provided with the hardcoat layer can be prevented from deforming. However, since the fine inorganic particles have low affinity for the binder polymer, if the fine inorganic particles are added as they are, the interface between the fine inorganic particles and the binder polymer is easily broken, and it is difficult to improve the scratch resistance and the deformation. By subjecting the fine inorganic particles to a surface treatment with the above-mentioned surface treatment agent having high affinity for the particles, the affinity between the fine inorganic particles and the binder polymer can be improved.

With regard to the fine inorganic particles, those having a high hardness are preferable; the Mohs hardness thereof is at least 6, and more preferably at least 7. Examples thereof include silicon dioxide particles, titanium dioxide particles, zirconium oxide particles, aluminum oxide particles, tin oxide particles, calcium carbonate particles, barium sulfate particles, talc, kaolin, and calcium sulfate particles. Among these, silicon dioxide, titanium dioxide, aluminum oxide, and zirconium oxide particles are particularly preferable.

EXAMPLES

Figure 1:
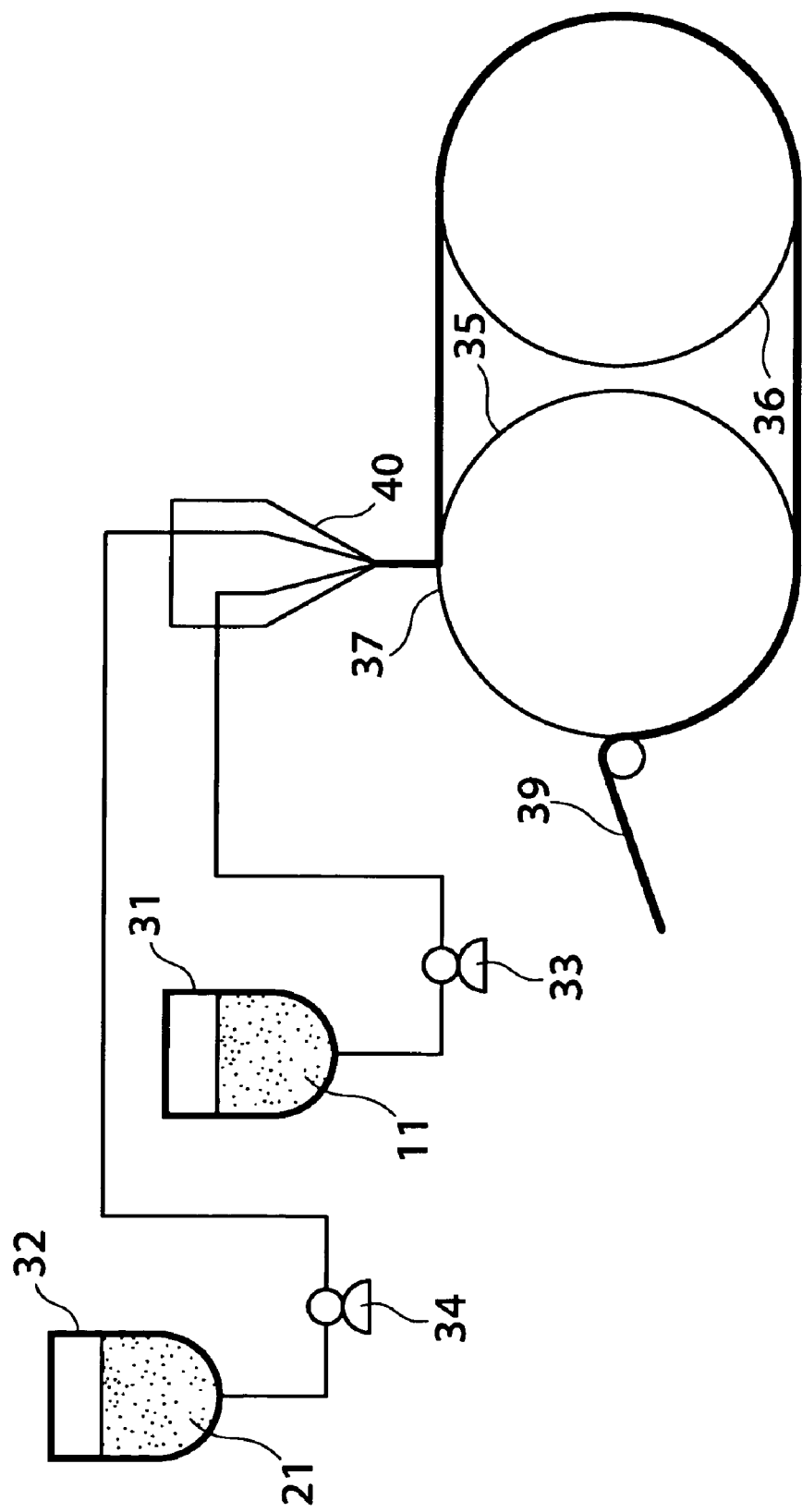
FIG. 1 is a schematic diagram of one example of production equipment for carrying out co-casting of a cellulose triacylate layered film of the present invention.

Specific examples are explained below by reference to Examples, but the present invention is not limited to these Examples.

Examples 1 to 6

In each Example, production of a cellulose acylate solution and a film and evaluation of properties of the obtained film were carried out as follows.

(1) Measurement of Modulus of Elasticity of Film Surface

The modulus of elasticity of a surface in the present invention is a value obtained using a surface microhardness tester (FISCHERSCOPE H100VP-HCU: manufactured by Fischer Instruments). Specifically, it is a value obtained from a universal hardness by measuring an indentation depth under a test load using a pyramidal diamond indenter (tip face angle: 136°) and dividing the test load by the surface area of the indentation formed by the test load calculated from the geometrical shape of the indenter. The indentation depth is 1 μm.

The modulus of elasticity of the film as a whole correlates with the modulus of elasticity of the surface obtained by this test.

(2) Film Pencil Hardness Test

The hardness by a pencil scratch test is a value of the hardness of a pencil for which there is no detectable scratch with a load of 9.8 N (1 kgf) according to a pencil hardness evaluation method defined by JIS-K-5400 using a test pencil defined by JIS-S-6006 after conditioning a prepared film at 25° C. and 60% RH for 2 hours.

(3) Transparency and Haze of Film

Measured using a haze meter (Model 1001 DP, manufactured by Nippon Denshoku Industries Co., Ltd.)

(4) Preparation of Cellulose Triacetate Solution

Cellulose triacetate (degree of substitution=2.7, viscosity-average degree of polymerization=310) (16 wt %) was gradually added to a mixed solution of methyl acetate/acetone/methanol (85/15/5 wt %) while stirring well, and the mixture was allowed to stand at room temperature (25° C.) for 3 hours thus causing swelling. The swollen mixture thus obtained was cooled to −30° C. at a rate of −8° C./min while slowly stirring, then cooled to −70° C., and after 6 hours had passed the temperature was raised at a rate of +8° C./min; when the contents had become solated to some extent stirring of the contents was started and they were heated to 50° C. to give a dope.

Added to the cellulose triacetate dope were silica particles (particle size 20 nm), triphenyl phosphate/biphenyl diphenyl phosphate (1/2), and 2,4-bis-(n-octylthio)-6-(4-hydroxy-3,5-di-tert-butylanilino)-1,3,5-triazine at 0.5 wt %, 10 wt %, and 1.0 wt % respectively relative to the cellulose acylate.

(5) Preparation of Filler-Filled Cellulose Triacetate Dope

A metal oxide (filler) and a surface modifying agent described in Table 1 were added to a mixed solution of methyl acetate/acetone/methanol (85/15/5 wt %) so that the amount of the metal oxide added to the cellulose triacetate would be as described in Table 1; the mixture was dispersed in a sand grinder mill using glass beads, this dispersion was added to the above-mentioned cellulose triacetate dope, and the mixture was further sheared and mixed by a kneader to give a filler-filled dope.

The dope thus obtained was then filtered using a filter paper having an absolute filtration rating of 0.01 mm (#63, manufactured by Toyo Roshi Kaisha, Ltd.), and further filtered using a filter paper having an absolute filtration rating of 0.0025 mm (FH025, manufactured by Pall) at 50° C.

(6) Production of Cellulose Acylate Film

A solution was cast in band form using a band casting machine having an effective length of 6 m and dried, and the film was peeled from the band. The film was further dried in an environment of 120° C. for 30 minutes so as to evaporate the solvent to give a cellulose acylate film. The film thickness was adjusted to 100 μm. The properties of the film thus prepared are given in Table 1.

(7) Formation of Hardcoat Layer 337 g of cyclohexanone, 31 g of PM-2 (phosphoric acid group-containing methacrylate, manufactured by Nippon Kayaku Co., Ltd.), and 92 g of AK-P-G015 (alumina: particle size 15 nm, manufactured by Sumitomo Chemical Co., Ltd.) were weighed and placed in a ceramic-coated vessel of a sand mill (¼G sand mill) and finely dispersed at 1600 rpm for 5 hours. As media, 1400 g of 1 mmφ zirconia beads were used. After dispersion, the beads were separated, and a surface-modified alumina was obtained.

97 g of methanol, 163 g of isopropanol, and 163 g of methyl isobutyl ketone were added to 116 g of a 43 wt % cyclohexanone dispersion of the surface-treated fine alumina particles. 200 g of a mixture of dipentaerythritol pentaacrylate and dipentaerythritol hexaacrylate (DPHA, manufactured by Nippon Kayaku Co., Ltd.) and 7.5 g of a photopolymerization initiator (Irgacure 184, manufactured by Ciba-Geigy) were added thereto and dissolved. After the mixture was stirred for 30 minutes, it was filtered using a polypropylene filter having a pore size of 1 μm to give an ionizing radiation curing hardcoat layer coating solution.

This hardcoat layer coating solution was applied to the cellulose triacetate films described in Table 1 as a substrate using a wire bar so as to have a dry film thickness of 10 μm, dried, and irradiated with UV rays to give hardcoat films having a cured layer. The properties of the hardcoat films thus prepared are given in Table 1.

TABLE 1

| | Filler | Particle size (nm) | Surface modifying agent/ treatment amount (wt %) | Filler conc. (vol %) | Modulus of elasticity of surface (GPa) | Pencil hardness | Transparency (%) | Haze (%) | Pencil hardness after applying hardcoat |
|---|---|---|---|---|---|---|---|---|---|
| Example 1 | Alumina (aluminum oxide C; manufactured by Nippon Aerosil Co., Ltd.) | 13 | a/10% | 5 | 4.0 | B | 91 | 0.8 | 3H |
| Example 2 | Same as above | 13 | a/10% | 10 | 4.2 | B | 90 | 1.0 | 3H |
| Example 3 | Same as above | 13 | a/10% | 20 | 4.5 | HB | 86 | 1.2 | 4H |
| Example 4 | Alumina (AKP-G015; manufactured by Sumitomo Chemical Co., Ltd.) | Major axis 100 * | a/10% | 10 | 4.1 | B | 90 | 1.0 | 3H |
| Example 5 | Alumina (AKP-50; manufactured by Sumitomo Chemical Co., Ltd.) | 200 | a/10% | 10 | 4.2 | B | 90 | 1.1 | 3H |
| Example 6 | Silica (AEROSIL 200; manufactured by Nippon Aerosil Co., Ltd.) | 12 | b/10% | 10 | 4.1 | B | 91 | 0.9 | 3H |

TABLE 1-continued

| | Filler | Particle size (nm) | Surface modifying agent/ treatment amount (wt %) | Filler conc. (vol %) | Modulus of elasticity of surface (GPa) | Pencil hardness | Transparency (%) | Haze (%) | Pencil hardness after applying hardcoat |
|---|---|---|---|---|---|---|---|---|---|
| Comp. Ex. 1 | None | — | — | — | 3.5 | 2B | 93 | 0.6 | 2H |
| Comp. Ex. 2 | Alumina (AKP-20; manufactured by Sumitomo Chemical Co., Ltd.) | 500 | a/10% | 10 | 4.3 | B | 85 | 5.0 | 3H |

Surface modifying agent a: $CH_3COO(C_5H_{10}COO)_2H$
Surface modifying agent b: $CH_3COCH_2COOC_3H_6Si(OCH_3)_3$
\* pyramidal, minor axis 10 nm (aspect ratio 10)

Examples 7 and 8

A cellulose acetate solution without the fillers described in (4) above and the dope of Example 6 shown in Table 1 were prepared, and simultaneously extruded and cast on a stainless support (cooling drum) maintained at −5° C. using a double layer co-casting die as shown in FIG. 1 so that the filler-filled dope was on the stainless support side. Hot air at 50° C. was then passed over the cast dope surface and it was dried for 1 minute, the cast film was peeled from the support and further dried at 120° C. for 30 minutes, and two types of samples of the double-layered structure cellulose acylate film according to the present invention were thus produced as Example 7 and Example 8. The dry thicknesses of the filler filled layer and the layer without filler of the samples thus obtained were as shown in Table 2. The total thickness of the two layers was 100 μm. The hardcoat layer was formed on the filler-filled side.

Comparative Example 3

For comparison, a double layer structured cellulose acylate film was prepared in the same manner as in Example 7 except that a dope having the same composition as that of (4) was used instead of the dope of Example 6.

The evaluation results obtained are all shown in Table 2. HC denotes a hardcoat layer.

TABLE 2

| | Thickness of layer with filler (μm) | Thickness of layer without filler (μm) | Surface elastic modulus (GPa) | Pencil hardness | Transparency (%) | Haze (%) | Pencil Hardness with HC |
|---|---|---|---|---|---|---|---|
| Example 7 | 40 | 60 | 4.0 | B | 92 | 0.7 | 3H |
| Example 8 | 50 | 50 | 4.1 | B | 91 | 0.8 | 3H |
| Comp. Ex. 3 | 0 | 50/50 | 3.5 | 2B | 93 | 0.6 | 2H |

As shown in Table 1, the metal oxide-filled cellulose acylate films of the present invention have high surface hardness and excellent mechanical and optical properties. Furthermore, when they are used as a hardcoat film, the pencil hardness increases, and they are effective as a substrate of a surface protection film or an antireflective film, where the surface hardness is required.

The invention claimed is:

1. A cellulose acylate film comprising at least 5 vol % and at most 50 vol % of metal oxide particles having an average particle size of at least 5 nm and at most 200 nm, wherein the metal oxide particles have been subjected to a surface treatment with a surface modifying agent,
   wherein the average transparency of the cellulose acylate film is at least 85% in the visible range.

2. The cellulose acylate film according to claim 1 wherein the metal oxide is a metal oxide having a Mohs hardness of at least 7.

3. The cellulose acylate film according to claim 1 wherein the metal oxide is aluminum oxide or silicon dioxide.

4. The cellulose acylate film according to claim 2 wherein the metal oxide is aluminum oxide or silicon dioxide.

5. The cellulose acylate film according to claim 1 wherein it has a modulus of surface elasticity of at least 4 GPa.

6. The cellulose acylate film according to claim 2 wherein it has a modulus of surface elasticity of at least 4 GPa.

7. The cellulose acylate film according to claim 3 wherein it has a modulus of surface elasticity of at least 4 GPa.

8. The cellulose acylate film according to claim 4 wherein it has a modulus of surface elasticity of at least 4 GPa.

9. A process for producing the cellulose acylate film of claim 1 comprising casting a cellulose acylate dope comprising at least 5 vol % and at most 50 vol % of a fine dispersion of fine metal oxide particles having an average particle size of at least 5 nm and at most 200 nm, the fine metal oxide particles having been subjected to a surface treatment with a surface modifying agent,
   wherein the average transparency of the cellulose acylate film is at least 85% in the visible range.

10. A cellulose acylate film according to claim 1, wherein the surface modifying agent comprises a silane coupling agent or a terminal carboxylic acid ester compound.

\* \* \* \* \*